Oct. 28, 1952     W. S. LANDON     2,615,671

METERING VALVE

Filed May 15, 1947

INVENTOR.
Marion E. Landon, Admx. of
Est. of Walter S. Landon, Dec'd.
BY Andrew K. Foulds
her ATTORNEY Patented Oct. 28, 1952

2,615,671

UNITED STATES PATENT OFFICE 2,615,671

METERING VALVE

Walter S. Landon, deceased, late of Detroit, Mich., by Marion E. Landon, administratrix, Detroit, Mich., assignor to Detroit Lubricator Company, Detroit, Mich., a corporation of Michigan Application May 15, 1947, Serial No. 748,297

3 Claims. (Cl. 251—34)

This invention relates to new and useful improvements in metering valves.

An object of this invention is to provide a metering valve which will meter a substantially uniform quantity of fluid per unit displacement of the cam actuating said valve even though said cam is of such a construction as to give a non-uniform rate of movement of the metering valve stem.

Another object of this invention is to provide a metering valve of a construction such that the ratio of fluid discharge to unit movement of the means actuating said valve will approximate predetermined value.

Another object of this invention is to provide a metering valve which will meter a predetermined quantity of fluid upon a predetermined initial movement of the valve stem.

Another object of this invention is to provide a metering valve which is simply constructed, efficient to operate and inexpensive to manufacture.

This invention consists in the improved construction and combination of parts to be more fully described hereinafter and the novelty of which will be particularly pointed out and distinctly claimed.

In the accompanying drawing to be taken as part of the specification, there are fully and clearly illustrated two preferred embodiments of this invention, in which drawing.

Figure 1:
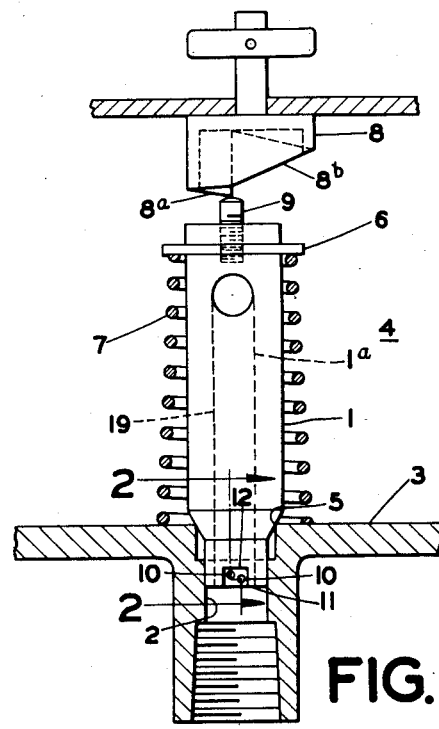
Fig. 1 is a view in vertical section of the principal form of the invention.
Figure 2:
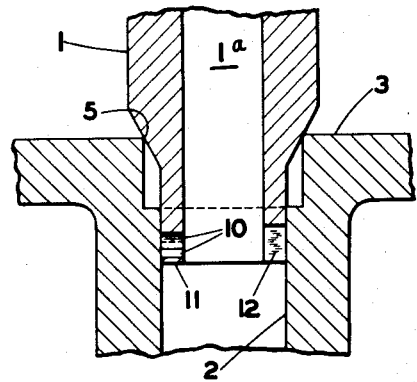
Fig. 2 is a view in section taken along the line 2—2 of Fig. 1.

Referring to drawing by character of reference in Fig. 1, the numeral 1 refers to a metering valve stem having a longitudinal control passageway 1ª. As in all conventional metering valves the valve stem 1 is positioned in an opening 2 in a wall 3 of the metering valve 4. The valve stem 1 seats at 5 in the wall 3. Surrounding and affixed to the upper portion of stem 1 is a collar 6. Positioned between the collar 6 and the wall 3 is a spring 7 which urges the valve stem 1 towards an upward or open position. A cam 8 acts through a screw or other bearing member 9 to actuate the valve stem 1. The screw 9 may be adjusted to determine the position of the valve stem 1 for any given position of the cam 8. The cam 8 is constructed with two or more slopes of surface 8ª and 8ᵇ so that the movement thereof will produce a variable rate of movement of the valve stem 1. The construction thus far described is that of an ordinary metering valve wherein it is desired to change the rate of discharge of fluid around the valve stem 1 by the use of the double sloped cam. Under certain conditions it is desirable to produce a uniform rate of discharge of fluid per unit movement of the cam 8 without resorting to replacement of this cam with a uniformly sloped cam. To produce this desired effect one or more holes 10 are drilled through the wall 11 of the valve stem 1 to compensate for the variable slope of the cam 8. The holes 10 perform this function of compensation by permitting additional fluid to be metered at the points where the movement of the cam 8 is insufficient to produce the metering effect desired. In most applications of this principle, the drill holes 10 should be positioned below the upper limit of the metering slot 12.

In operation this form of the invention functions as follows:

When the cam 8 is moved the spring 7 causes the valve stem 1 to move upward. In the ordinary form of metering valve, the movement of the valve stem 1 upon movement of the cam 8 will produce a rate of discharge curve as shown by the broken line ABC in Fig. 4.

Figure 4:
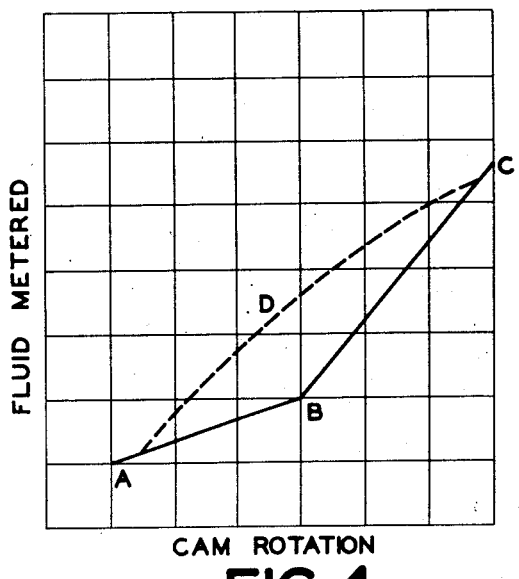
Fig. 4 is a graph showing the relation between rate of discharge of fluid from the valve and unit movement of the cam actuating the valve.

This graph as shown in Fig. 4 illustrates the ratio of rate of discharge of fluid to unit movement of the cam. As the lower sloped surface 8ª of the cam 8 moves permitting the valve stem 1 to move upward the rate of discharge of fluid through the valve increases as along the line AB of Fig. 4. When the point is reached in the movement of cam 8 at which a higher sloped surface 8ᵇ bears against the screw 9 the rate of discharge of fluid increases as along the line BC of Fig. 4. With the drill holes added as in this invention, when the valve stem 1 begins to move upward the initial rate of discharge per unit movement of the cam 8 follows line AB of Fig. 4. A small movement of the valve stem 1 will cause one of the holes 10 to be in a position to permit flow of fluid therethrough and further movement of the valve stem 1 will cause the other of the holes 10 to pass fluid thus causing the rate of discharge of fluid per unit movement of the cam 8 to increase substantially along the curve D of Fig. 4. It should be noted that the holes 10 are spaced circumferentially of the valve stem and overlap longitudinally thereof at a point opposite the central portion of the metering slot 12 so that upon longitudinal movement of the valve stem the progressively increasing change in flow area is effected followed by a progressively decreasing change in flow area and providing the equivalent of a diamond shaped opening to compensate for the different cam slopes. The dotted curve D of Fig. 4 represents only an approximation of the flow curve obtained and the true curve would vary slightly from one side to the other of that curve.

Figure 3:
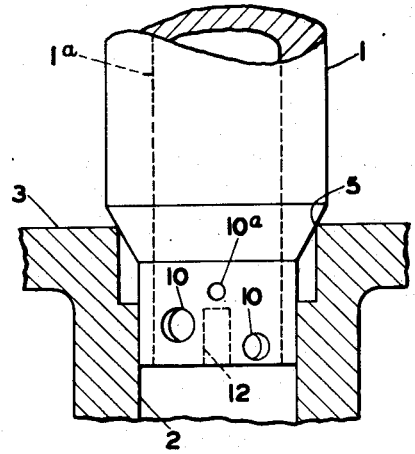
Fig. 3 is a modification of the invention.

In Fig. 3 a modification of this invention is shown wherein one of the holes $10^a$ is positioned above the upper surface of the metering slot 12 a sufficient distance that a very small initial movement of the valve stem 1 will permit a predetermined amount of fluid to flow through the hole $10^a$. In all other details this form of the invention corresponds to the principal form.

In operation this form of the invention functions as follows:

The same compensation for the double sloped cam 8 is obtained in this modification as in the principal form of the invention. The essential difference in this modification is that the hole $10^a$ is positioned so that a very small movement of the valve stem 1 will permit flow of fluid therethrough. This modification is especially adapted for metering liquid fuel to a burner wherein it is desired to have a constant amount of fuel metered for a predetermined small opening of the valve. The metering of fuel through this hole $10^a$ would provide the necessary amount of fuel for pilot operation independently of the metering slot 12.

In the foregoing specification there were described two preferred embodiments of this invention. It is obvious, however, to anyone skilled in the art that many minor changes could be made herein without departing from the scope and intent of the original invention.

What is claimed and is desired to be secured by Letters Patent of the United States is:

1. In a fluid metering valve, means for ingress of fluid, an opening for egress of fluid, a hollow cylindrical valve stem closing said opening, said valve stem seating against a portion of said opening, spring means urging said valve stem toward an open position, a cam means cooperable with said valve stem to cause movement thereof, the bearing surface of said cam means having two or more slopes, said cam means being operable upon movement thereof to cause a variable rate of movement of said valve stem, said valve stem having a metering slot in the wall thereof for metering fluid, the wall of said valve stem also having two circular holes to compensate for the variable movement of said cam means, said holes being spaced circumferentially on said stem and overlapping longitudinally thereof at a point opposite the central portion of said slot, and the spacing of said holes being operable to cause a progressively increasing change in flow opening followed by a progressively decreasing change in flow opening thereby to effect an approximately uniform change of rate of discharge of said fluid per unit movement of said cam means.

2. In a fluid metering valve, means for ingress of fluid, an opening for egress of fluid, a hollow cylindrical valve stem closing said opening, said valve stem seating against a portion of said opening, spring means urging said valve stem toward an open position, a cam cooperable with said valve stem to cause movement thereof, the bearing surface of said cam having two different slopes, said cam being operable to cause two different rates of movement of said valve stem, a metering slot extending through the wall of said valve stem, the circular openings extending through the wall of said valve stem operable to compensate for the variable movement of said cam thereby to approximate a substantially uniform change of rate of discharge of said fluid per unit movement of said cam, one of said openings being positioned above the upper limit of said metering slot thereby to cause a predetermined amount of fluid to be metered upon a predetermined initial opening movement of said valve stem, and the other two of said openings being spaced circumferentially on said stem and overlapping longitudinally thereof at a point opposite the central portion of said slot thereby to cause a progressively increasing change in flow opening followed by a progressively decreasing change in flow opening to effect an approximately uniform change of rate of discharge of said fluid per unit movement of said cam.

3. In a metering valve, a wall having a port, a valve member cooperable with said port to meter flow therethrough, said valve member having a longitudinal slot cooperable with the wall of said port and constructed to provide substantially equal changes of fluid flow for all equal increments of open valve member movement, a cam follower on said valve member, cam means cooperable with said follower to move said valve member, said cam means having at least two joining cam face portions with relatively different rates of cam rise, said face portions together providing a range of cam means movement such that said valve member will have one rate of movement when said follower is in engagement with one face portion and a different rate of movement when said follower is in engagement with the adjoining face portion, and means controlled by valve member movement for supplemental flow through said port, said last-named means comprising two circular holes in the wall of said valve stem spaced circumferentially thereof and overlapping longitudinally at a point opposite the central portion of said metering slot and providing a progressively increasing change in flow opening followed by a progressively decreasing change in flow opening thereby to effect an approximately uniform change of rate of flow per unit movement of said cam means.

MARION E. LANDON,
*Administratrix of the Estate of Walter S. Landon, Deceased.*

REFERENCES CITED

The following references are of record in the file of this patent:

UNITED STATES PATENTS

| Number | Name | Date |
|---|---|---|
| 2,106,300 | Harrison | Jan. 25, 1938 |
| 2,117,182 | Lewis | May 10, 1938 |
| 2,155,761 | Johnson | Apr. 25, 1939 |
| 2,244,161 | Johnson | June 3, 1941 |
| 2,301,041 | Hann | Nov. 3, 1942 |
| 2,399,938 | Pett | May 7, 1946 |